United States Patent [19]

Ceravolo

[11] Patent Number: 4,932,390

[45] Date of Patent: Jun. 12, 1990

[54] ADJUSTABLE BARBECUE GRILL

[76] Inventor: Frank J. Ceravolo, 2887 N.E. 29th St., Fort Lauderdale, Fla. 33306

[21] Appl. No.: 458,391

[22] Filed: Dec. 28, 1989

[51] Int. Cl.⁵ .............................................. F24B 3/00
[52] U.S. Cl. .............................. 126/25 AA; 126/25 R
[58] Field of Search .............. 126/25 R, 25 A, 25 AA

[56] References Cited

U.S. PATENT DOCUMENTS 3,258,001  6/1966  Virgil ............................ 126/25 AA
3,657,996  4/1972  Thompson .................... 126/25 AA Primary Examiner—Carroll B. Dority
Attorney, Agent, or Firm—Oltman and Flynn

[57] ABSTRACT

The present grill has a food-support grid that is adjustable both vertically and rotatively. The vertical adjustment determines the spacing of the food being cooked above the charcoal or other heat source. The rotative adjustment enables the food to be positioned to one side of the charcoal or other heat source, for example, to provide a keep-warm mode for already-cooked food or a thawing mode for frozen food yet to be cooked.

8 Claims, 2 Drawing Sheets

ADJUSTABLE BARBECUE GRILL

BACKGROUND OF THE INVENTION

1. Field of the invention

The present invention relates generally to barbecue grills and more particularly to grills which can be adjusted to allow for more efficient cooking.

2. Description of the prior art

People all over the world have enjoyed cooking various types of meat and the like outdoors for hundreds of years. A wide variety of barbecue grills have been developed which are specifically adapted to particular cooking methods or for ease of use. Many grills provide a cooking surface which may be vertically raised or lowered such that the user has control over the speed and degree of cooking. However, a problem exists in the art wherein a user may light the coals and begin cooking the food and at a later time decide the grill cooking surface is either too close or too far from the hot coals. At this point it can be dangerous and difficult to adjust the location of the cooking surface.

A secondary problem occurs when a portion of the food cooks very quickly and is ready to eat while the rest is still cooking. If the completely cooked food is kept over the coals while the rest finishes cooking, it may become burnt and charred and consequently lose its good flavor. Alternatively, if the completely cooked food is removed from the coals onto a plate it will likely become cold before the rest of the food is done.

The present invention has been specifically developed to overcome these two common problems in a novel fashion.

SUMMARY OF THE INVENTION

The present invention includes a grill whose cooking surface is readily adjustable both rotatably about a vertical axis and vertically.

Preferably, the cooking surface is provided by a metal food-support grid of circular outline which is slidable and rotatable on a fixed lower post positioned centrally inside the firebox of the grill. The food-support grid is screw-threadedly adjustable vertically by turning an upper handle. The foodsupport grid is rotatably adjustable by turning a lower handle that has a rigid connection to the grid. A principal object of this invention is to provide a novel grill having a food-support grid which is selectively adjustable both vertically and rotatably to change the position of the food on it with respect to burning charcoal, for example.

Another object of this invention is to provide such a grill in which the food-support grid can be precisely positioned vertically anywhere between upper and lower limits.

Another object of this invention is to provide such a grill in which the food-support grid can be precisely positioned at any desired rotational position over a 360 degree range.

Another object of this invention is to provide such a grill in which the selective positioning of the food support grid is accomplished by simple manual adjustments involving no likelihood of danger to the user's hands from the burning charcoal.

Further objects and advantages of this invention will be apparent from the following detailed description of a presently-preferred embodiment thereof, shown in the accompanying drawings.

DETAILED DESCRIPTION

Figure 1:
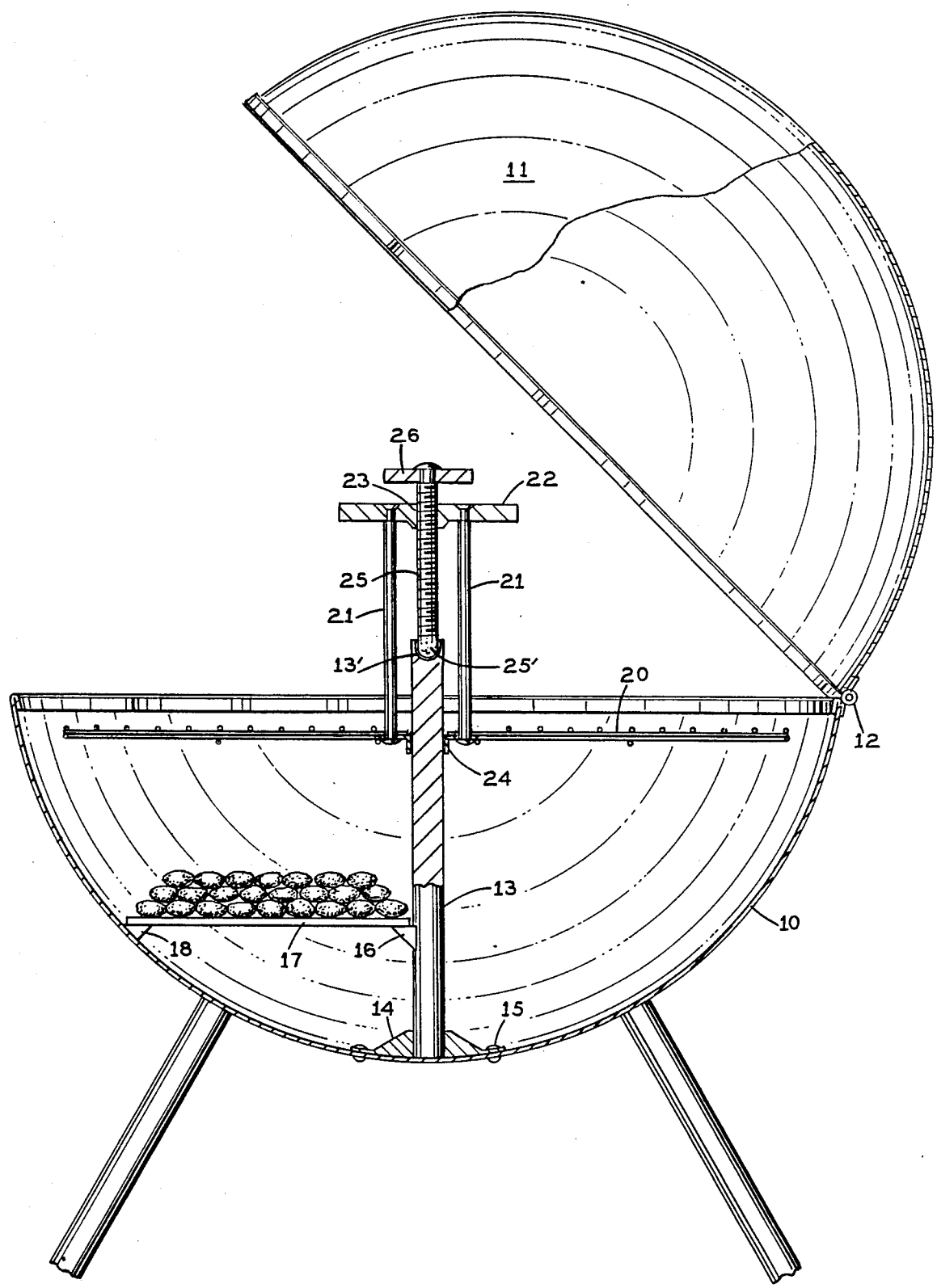
FIG. 1 is a view of the invention showing the firebox of the grill in vertical section, the hinged cover partly in elevation and partly in vertical section, and the food-support grid in its raised position.

Referring to FIG. 1, the present grill is shown as having a hemispherical firebox 10 and a hemispherical top cover 11 is attached to the firebox at a horizontal hinge 12 on one side. The top cover may be raised to an open position, as shown in FIG. 1, or lowered to a closed position covering the top of the firebox 10. It will be understood that the firebox and its cover may have different shapes from the ones shown here for illustrative purpose.

Figure 3:
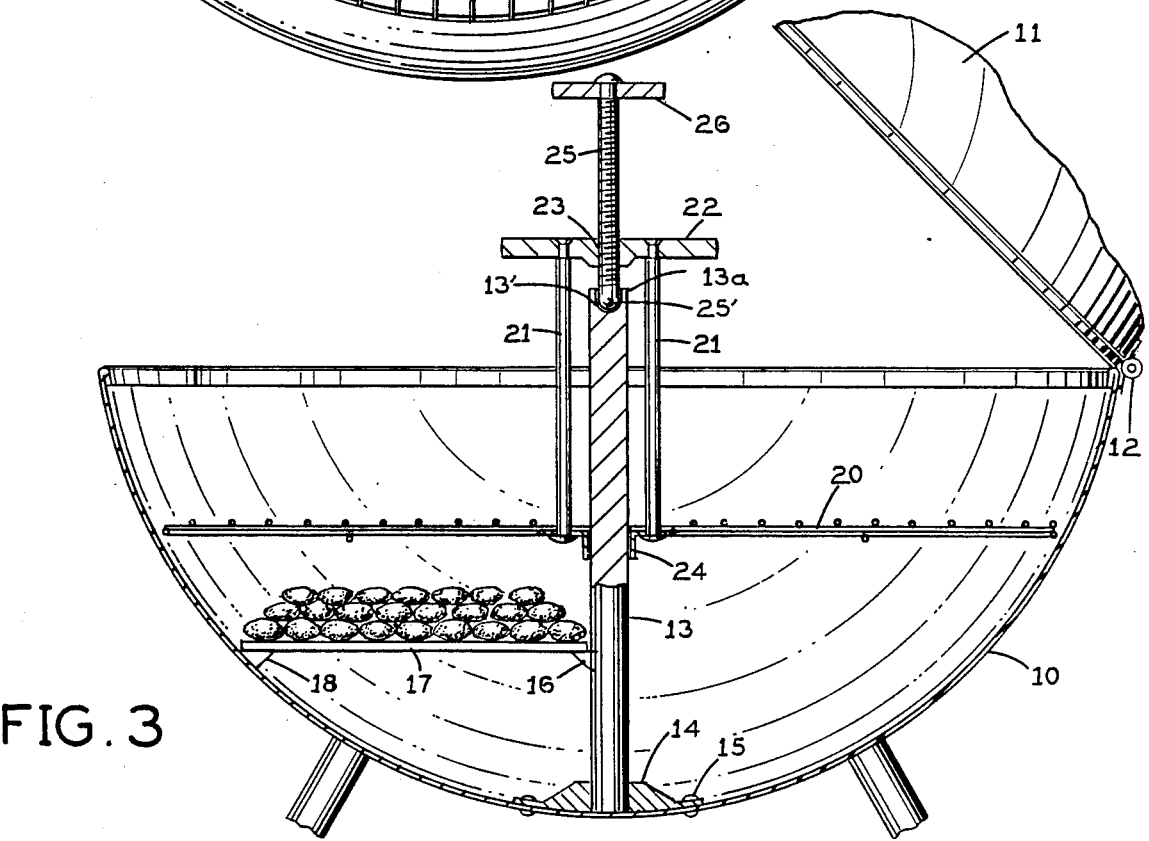
FIG. 3 is a view like FIG. 1 but with the foodsupport grid lowered and the hinged cover not shown.

The grill has a fixed post 13 extending vertically up from the bottom of the firebox 10 centrally inside the firebox. Preferably, post 13 is of solid cylindrical shape. As best seen in FIG. 3, the lower end of the lower post 13 is seated in an annular base 14 which is fixedly attached by rivets 15 or other suitable fasteners to the bottom of the firebox. The upper end of post 13 presents an upwardly-facing semi-spherical socket or recess 13'.

Figure 2:
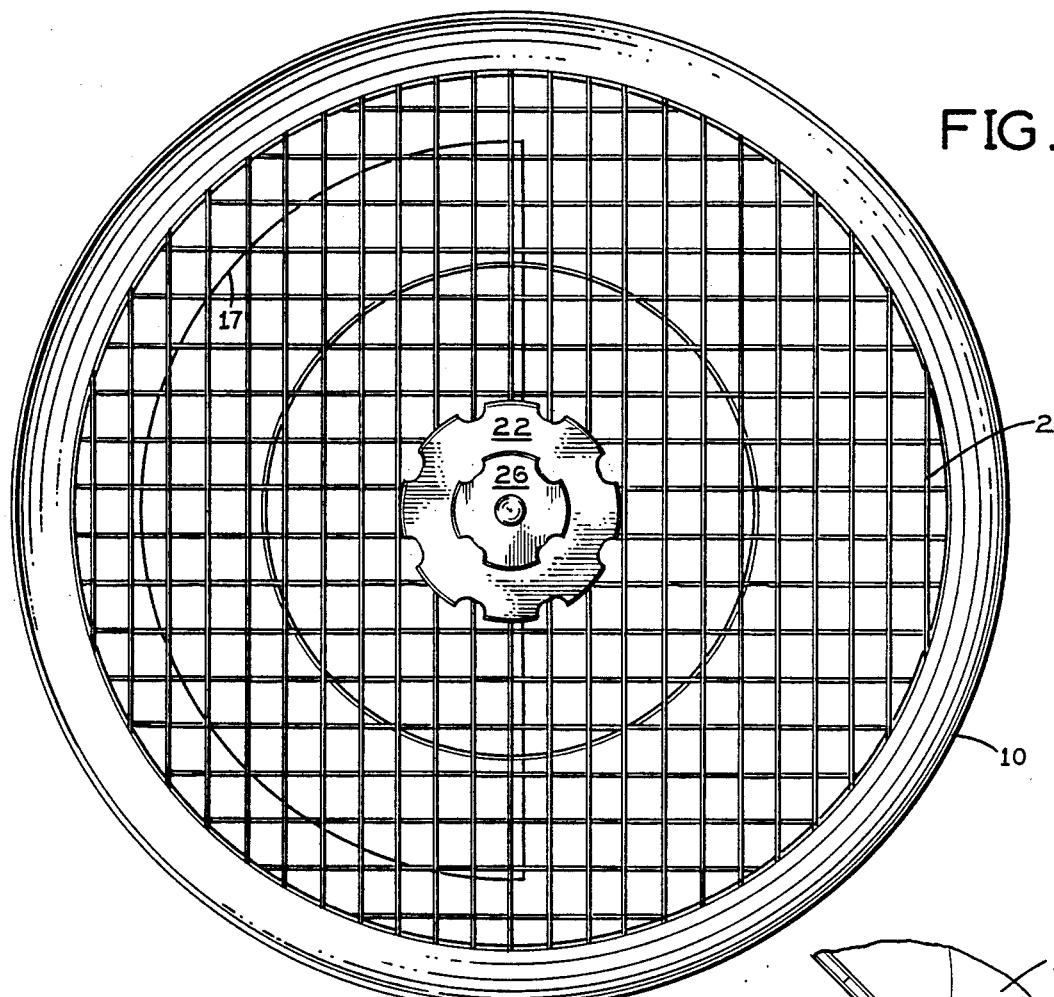
FIG. 2 is a top plan view taken along the line 2—2 in FIG. 1, looking down on the food-support grid of the grill and with the charcoal removed from its support grate in the grill.

A short distance above the base 14, the post has an integral, annular, horizontal flange 16 on the outside for supporting from below a perforated charcoal-support grate 17. As shown in FIG. 2, grate 17 is semi-circular and it extends laterally out from the post 13 to a support ledge 18 (FIG. 1) on the inside of firebox 10. Thus, the charcoal-support grate 17 extends across the inside of firebox 10 for only about half its inside area of this level.

A foot-support grid 20 of circular outline is rigidly attached to the lower end of two or more rigid vertical rods 21, the upper ends of which are rigidly attached to a lower handle 22. Handle 22 has a screw-threaded, centrally located, vertical opening 23. Grid 20 has a flanged central sleeve 24 which slidably engages the post 13.

A screw-threaded shaft 25 is threadedly received in the opening 23 and extends vertically above and below the lower handle 22. Shaft 25 has a semi-spherical lower end segment 25' which is complementary to and is snugly received in the socket 13' on the upper end of post 13. The diameter of this semi-spherical lower end segment 25' is equal to the maximum diameter of the screw-threaded shaft 25. An upper handle 26 is attached to the upper end of shaft 25.

To raise or lower the food-support grid 20, the user turns the upper handle 26 in the proper direction while holding the food support grid 20 against turning, such as with a meat fork or other cooking utensil. The semi-spherical lower end segment 25' of screw-threaded shaft 25 slides across the surface of socket 13' on the upper end of post 13, permitting the upper handle 26 to be turned reasonably easily. The screw-threaded engagement between the shaft 25 and the lower handle 22 at the latter's screw-threaded opening 23 causes this handle 22, the rods 21 and food-support grid 20 to be displaced up or down, depending upon the direction of rotation of shaft 25. FIG. 1 shows the food-support grid 20 in a raised position and FIG. 3 shows it in a lowered position, closer to the charcoal C on the charcoal support grate 17 in the firebox.

To rotate the food-support grid 20, the user turns the lower handle 22. Normally, the maximum rotation of grid 20 will be only a half-turn so the vertical position of the grid will change only slightly as a result of the screw-threaded engagement, as described, between lower handle 22 and the screw-threded shaft 25.

From the foregoing it will be apparent that this invention enables the food-support grid 20 to be precisely adjusted vertically and turned to any desired position conveniently and without danger to the person using the grill.

If desired, the semi-circular grate 17 which supports the charcoal may be replaced by a circular grate extending completely across the inside of the firebox at this level, or two semi-circular grates may be provided which together extend completely across the inside of the firebox. Also, if desired, the charcoal grate or grates may be omitted, in which case the charcoal would be piled directly on the bottom of the firebox. The food support grid 20 can be lifted up for cleaning purposes.

I claim:

1. A grill comprising:
   a firebox having a bottom and a peripheral sidewall extending up from said bottom;
   a post extending up from said bottom and spaced from said peripheral sidewall of the firebox;
   a food-support grid slidably and rotatably mounted on said post;
   a lower handle above said grid, and means rigidly coupling said lower handle to said grid so that said grid can be rotated on said post by turning said lower handle;
   an upper handle above said lower handle;
   and means for screw-threadedly raising and lowering said grid along said post in response to turning said upper handle.

2. A grill according to claim 1 and further comprising:
   a charcoal-support grate extending only part-way across the interior of said firebox below said food-support grid.

3. A grill according to claim 1 wherein said means for screw-threadedly raising and lowering said grid comprises:
   a shaft attached to and extending down from said upper handle and having screw-threads thereon;
   a screw-threaded opening in said lower handle threadedly receiving said shaft;
   a rounded lower end segment of said shaft below said lower handle;
   and an upwardly-facing socket on the upper end of said post engaged by said lower end segment of said shaft.

4. A grill according to claim 3 and further comprising:
   a charcoal-support grate extending only part-way across the interior of said firebox below said food-support grid.

5. A grill comprising:
   a firebox having a bottom and a peripheral sidewall extending up from said bottom;
   a post extending up from said bottom and spaced from said peripheral sidewall of the firebox, said post having an upwardly-facing socket at its upper end;
   a food-support grid slidably and rotatably mounted on said post;
   a lower handle above said grid and above the upper end of said post, and means rigidly coupling said lower handle to said grid so that said grid can be turned on said post by turning said lower handle and said grid can be slid up along said post by raising said lower handle, said lower handle having a screw-threaded opening therein aligned vertically with said socket in the upper end of said post;
   an upper handle above said lower handle;
   and a screw-threaded shaft connected to and extending down from said upper handle, said shaft being threadedly received in said opening in the lower handle and extending down through said lower handle to the upper end of said post, said shaft at its lower end being shaped complementary to said socket and rotatably engaging said post at said socket, whereby said lower handle and said grid are raised and lowered in response to turning said upper handle.

6. A grill according to claim 5 and further comprising:
   a charcoal-support grate extending only part-way across the interior of said firebox below said food-support grid.

7. A grill comprising:
   a firebox having a bottom and a peripheral sidewall extending up from said bottom;
   a post extending up from said bottom and spaced from said peripheral sidewall of the firebox, said post having an upwardly-facing socket at its upper end;
   a food-support grid slidably and rotatably mounted on said post, said grid being removable from said post by sliding said grid up along said post;
   a lower handle above said grid and above the upper end of said post, and means rigidly coupling said lower handle to said grid so that said grid can be turned on said post by turning said lower handle and said grid can be slid up along said post by raising said lower handle, said lower handle having a screw-threaded opening therein aligned vertically with said socket in the upper end of said post;
   an upper handle above said lower handle;
   and a screw-threaded shaft connected to and extending down from said upper handle, said shaft being threadedly received in said opening in the lower handle and extending down through said lower handle to the upper end of said post, said shaft being screw-threadedly removable up through said lower handle, and said shaft at its lower end being shaped complementary to said socket and rotatably engaging said post at said socket, whereby said lower handle and said grid are raised and lowered in response to turning said upper handle.

8. A grill according to claim 7 and further comprising:
   a charcoal-support grate extending only part-way across the interior of said firebox below said food-support grid.

* * * * *